United States Patent
Risley

(10) Patent No.: US 6,696,509 B2
(45) Date of Patent: Feb. 24, 2004

(54) POLYCARBONATE SOLID SURFACE COMPOSITION

(75) Inventor: Lon Risley, Riverside, CA (US)

(73) Assignee: Avonite, Inc., Belen, NM (US)

( * ) Notice: Subject to any disclaimer, the term of this patent is extended or adjusted under 35 U.S.C. 154(b) by 400 days.

(21) Appl. No.: 09/767,517

(22) Filed: Jan. 23, 2001

(65) Prior Publication Data
US 2002/0135092 A1 Sep. 26, 2002

(51) Int. Cl.⁷ .................................................. C09D 5/29
(52) U.S. Cl. ........................................ 523/171; 524/437
(58) Field of Search ............................ 523/171; 524/437

(56) References Cited

U.S. PATENT DOCUMENTS 5,244,941 A * 9/1993 Bruckbauer et al. ........ 523/171

* cited by examiner

Primary Examiner—Edward J. Cain
(74) Attorney, Agent, or Firm—Thorp Reed & Armstrong, LLP

(57) ABSTRACT

The present invention comprises a polycarbonate solid surface product through utilization of polycarbonate flakes. The polycarbonate flakes offer unique shapes and improved ultra-violet stability to the product. The polycarbonate flakes are also a source of consistent clear particulate and provide for increased mechanical properties in some areas over prior art 100% polyester products. Additional, fire retardant polycarbonate offers fire retardancy in a clear chip unlike opaque ATH filled polyester chips, or UV sensitive polyester that has been halogenated.

25 Claims, No Drawings

POLYCARBONATE SOLID SURFACE COMPOSITION

TECHNICAL FIELD

The present invention relates to a new polycarbonate composition for use in producing solid surface products.

BACKGROUND OF THE INVENTION

Solid surface products are similar to synthetic marble, or onyx, in that all of these products use polyester resin combined with pigments, catalyst and organic or inorganic fillers. Solid surface products and synthetic marble and onyx products have both been commercialized for the same product applications. However, solid surface products more closely resemble natural occurring stone in appearance because solid surface products contain a ground polymer filler which provides the products with a granular appearance similar to naturally occurring stone. Further, solid surface products have features that make them as workable as wood. More specifically, cultured or synthetic marble uses a gel coat, which is a thin layer of polyester resin, to protect the composition. The gel coat prevents cutting, sanding or machining these castings once they are complete. Solid surface products on the other hand do not use a gel coat, and because of the pre-selected hardness of the fillers, solid surface products can be machined, carved, sanded, cut or chipped just like wood or stone. Typically solid surface products are used to manufacture counter-tops, floors, wall cladding, furniture, service counters, vanities, tub and shower surrounds, wall dividers, doors and numerous other products.

There are generally two types of solid surface products, that is, either polyester or acrylic. Polyester solid surface products are typically comprised of a ground polyester filler or particulate in a polyester matrix. Acrylic solid surface products are typically comprised of a ground acrylic filler or particulate in an acrylic matrix. In almost all cases, alumina trihydrate (ATH) and pigments are found in both components of each product, that is, in both the filler and the matrix.

In both polyester and acrylic solid surface products, either the polyester resin or the acrylic syrup is mixed with approximately 50–70 weight percent of ATH, approximately 1 weight percent pigment, and a catalyst and allowed to cure or harden into a casting. Once cured, the casting is ground to the desired particle size distribution. This ground filler, called particulate, is then added to additional polyester resin or acrylic syrup, along with ATH, pigment and a catalyst. The mixture is then poured to the desired size and shape and allowed to cure to its complete hardness. Once cured, the product is sanded to the specified thickness and degree of gloss.

One disadvantage of clear polyester particulate is that polyester cures in colors ranging from a light amber, to pink, gray or blue which effects the final product. Consequently, the final product may not be of an acceptable color.

One disadvantage of acrylic is that acrylic, without the addition of ATH, is unsuitable for use in solid surface because of its relatively low melt point which prohibits sanding and polishing. However, the addition of ATH into acrylic solid surface particulate reduces the clarity of the final product, which is oftentimes undesirable.

The opacity which results from the addition of ATH into acrylic and polyester solid surface products and the discoloration which results from the curing of polyester, oftentimes results in final products which are not of an acceptable color or clarity for the purchaser. This, in turn, can result in a high degree of scrap as the products are not of an acceptable standard for their desired use. An alternative, is to not use either ground polyester or ground acrylic filler, but to use a clear particulate as a filler. However, the use of a clear particulate as a filler may be quite expensive. Therefore, there is a need for a relatively inexpensive filler which does not produce a high degree of scrap due to improper color or clarity.

Additionally, there is also a need for a fire retardant solid surface product. While both polyester and acrylic are combustible, they can both be made fire retardant by the addition of ATH or halogens. However, in the case of ATH, the resultant opacity oftentimes renders the product unsuitable for its desired use. Additionally, halogens are oftentimes undesirable as they are cost prohibitive and sensitive to ultra violet yellowing. Therefore, there is a need for a relatively inexpensive fire retardant solid surface product which maintains its desired color and clarity.

Avonite Inc. produces a line of solid surface products referred to as the "Agate" products, which are an exception to standard solid surface products in that they consist of either no ATH, or very little (less than 10% by weight), and pigment. The, primary filler in the "Agate" products is "clear" ground polyester. The clear particulate gives the products a visual depth. However, the degree of clarity and water-white color needed for this filler is difficult to consistently produce. The term "water-white" is a polyester industry term which simply means as clear as water, or, in other standard industry terms, a Gardner color of less than 2 or an APHA color of less than 20. More particularly, the clear filler helps to transmit light which gives the casting a gem-like quality. Frequently, however, due to the gel/curing conditions, or the promoter composition of the resin, or catalyst, the resin will cure in shades of tan, pink, gray or blue. These colors will affect the transmission of light, or in a worse case scenario cast a hue of color throughout the casting.

Therefore, the need exists for the development of a solid surface product that is produced from a consistently water-white source of clear particulate filler. The need also exists for a solid surface product that is produced from a less expensive clear particulate which is capable of fire retardant qualities while maintaining its clarity. Finally, there exists the constant need for new appearances in the solid surface industry.

SUMMARY OF THE INVENTION

The present invention is a composition comprising: a polyester resin solution; an air-releasing agent; a wetting agent; a colorant; a thixing agent; an alumina trihydrate particle in the 15–25 micron size range; a clear particulate; and a polycarbonate flake.

Additionally, the present invention is a polycarbonate composition for use in producing solid surface products, comprising: from 40–60 weight percent of a polyester resin solution; from 00–00.5 weight percent of an air releasing agent; from 00–00.1 weight percent of a wetting agent; from 00–01.0 weight percent of a colorant; from 00–01.0 weight percent of a thixing agent; from 00–30.0 weight percent of an alumina trihydrate particle in the 15–25 micron size range; from 00–56.0 weight percent of a clear particulate; and from 05–25.0 weight percent of a polycarbonate flake.

DETAILED DESCRIPTION OF THE INVENTION

The present invention involves using polycarbonate flakes as a particulate filler to develop unique appearances in solid surface products. Polycarbonate flakes have a unique shape and translucency unlike that of either polyester or acrylic. This unique shape and translucency is partially due to the way that polycarbonate flakes are produced. That is, polycarbonate flakes are shaved rather than crushed, which gives them a flat surface with an irregular perimeter.

Another factor which gives the polycarbonate solid surface products their unique appearance is the optical quality of polycarbonate. As compared to polyester and acrylic, polycarbonate allows more light transmission of better quality through the product. Also, the polycarbonate flake easily absorbs some of the free monomer available in the polyester solution. The absorption of the free monomer by the polycarbonate flake produces a break-down of the polycarbonate flake and allows the flake to be fully incorporated into the mixture preventing dislodgment of the flake during sanding and cutting.

One advantage of the present invention is that mixtures of dissimilar polymers can function in a product that is normally thought of as having to be of the same material. That is, generally within the solid surface industry it is thought that only like materials would produce similar hardness between the matrix and the filler, thus producing a "phase undifferentiated" quality. The present invention allows for the use of dissimilar materials, i.e. a thermoplastic and a thermosetting plastic to produce a "phase undifferentiated" quality.

Additionally, another advantage is that polycarbonate flakes creates unique appearances in solid surface. Another advantage is that fire retardant polycarbonate flakes provides a lower cost fire retardant clear filler with less yellowing after exposure to light.

Finally, another advantage is that polycarbonate flakes may contribute to improved mechanical properties of the polycarbonate solid surface product over standard polyester solid surface. More specifically, materials with and without polycarbonate were measured. The results indicated that there was a ten to thirty percent increase in drop ball impact—that is, 36" drop ball was improved to 40" and in some cases 48–50". Also, it appears that flexural strength, in some compositions improved by a similar amount.

EXAMPLES

Table 1. shows the blend composition of one embodiment of the present invention.

TABLE 1

| Item # | Ingredient | Percent by Weight |
|---|---|---|
| 1. | Polyester Resin solution, 40% monomer | 52.10 |
| 2. | BPO LV40 (catalyst) | 00.36 |
| 3. | MEKP-9 (catalyst) | 00.36 |
| 4. | BYK 555 | 00.37 |
| 5. | BYK 990 | 00.04 |
| 6. | Skylight pigment | 00.03 |
| 7. | Aerosil 200 | 00.16 |
| 8. | ATH, OC 1000 | 05.89 |
| 9. | Fine clear polyester particulate | 31.11 |
| 10. | Polycarbonate, flat ground flakes | 09.58 |

The ten ingredients as listed in Table 1. are combined, under high shear mixing in the order that they are listed. "High Shear" is a term of art and generally refers to a double planetary mixing apparatus (although other devices that are not planetary can achieve the same result) that achieves high speed and thorough mixing.

The polyester resin solution (Item 1.), whose chemical name is isophthalic polyester resin solution and orthophthalic polyester resin solution is commercially available from Ashland Chemical Corp., Reichhold Chemical Corp, British Petroleum Chemical (Silmar Resins), Alpha Chemical Corp. and others. The polyester resin solution acts as a binder, or the reactive cementitious portion of the material which holds the fillers, Items 6–10., together. BPO LV40 and MEKP-9 (Items 2. and 3.), whose chemical names are benzoyl peroxide and methyl ethyl ketone peroxide respectively, are commercially available from U.S. Peroxygen, Reichhold Chemical Corp., Norac and Witco. BPO LV40 and MEKP-9 are catalysts which convert the polyester solution into a solid. BYK 555 (Item 4.) is commercially available from BYK Chemie. BYK 555 is an air release agent and helps to prevent air voids in the final casting. BYK 990 (Item 5.) is also commercially available from BYK Chemie. BYK 990 is a wetting agent, which assists in the addition of fillers and in maintaining the proper viscosity. BYK Chemie does not divulge the chemical names of BYK 555 or BYK 990, however, they are combinations of polymers, polysiloxanes and aromatic hydrocarbons.

Further, skylight pigment (Item 6.) is simply a colorant, and is interchangeable for the desired hue of the product. Skylight pigment is commercially available from Neste Corp., American Colors, Ram Chemical Corp. and others. Aerosil 200 (Item 7.), whose chemical name is fumed silica is commercially available from Degussa. Aerosil 200, the fumed silica, is a thixing agent and helps to stabilize the fillers so that they do not stratify. The term "thixing" is a chemical term that is used to define the increase in viscosity of liquids due to the addition of thixing agents such as fumed silica. Thixing is usually accomplished under high shear which allows the silica platlettes to arrange themselves in a polar orientation which maintains their suspension. ATH, OC 1000 (Item 8.), which is a precipitated form of ATH, is commercially available from Alcoa under the tradename OC 1000. The ATH particle size of OC 1000 is in the 15–25 micron range. ATH is used in the present embodiment to distribute heat during the exothermic reaction to increase physical properties, and also to create a slight opacity which is aesthetically useful in this particular embodiment. Fine clear particulate (Item 9.), whose chemical name is polyester resin solids and is manufactured by Avonite. Fine clear particulate is used to give the product a "grainy" appearance and is also, useful in preserving the integrity of the casting during the casting and cure process. Polycarbonate flakes (Item 10.) vary by composition. Lexan (a tradename for polycarbonate in its pure form) is commercially available from Monsanto, GE, Mitsubishi and many others and may be used. Polycarbonate flakes absorbs some of the monomer from the polyester solution of the present embodiment during the mixing process, allowing the flake to partially dissolve and become more intimately a part of the polyester casting. Further, the polycarbonate flake delivers a unique appearance of semi-frosted transparent particulate.

The process consists, more specifically, of filling a vessel with a desired amount of unsaturated polyester resin, and then adding to the resin the catalysts, wetting agents, air release agents and pigments. The dry additives are then added, that is, ground polyester particles, alumina trihydrate, ground copolymer (polycarbonate) and fumed silica according to the formula amount. The mixture is mixed under high shear and vacuum of 25 inches for approximately 30 to 60 minutes. After mixing, the mixture is dispersed into aluminum molds. The molds are then placed into an autoclave at approximately 200° F. and 110 psi for approximately 45 to 60 minutes. The molds are then removed from the autoclave and the castings are allowed to cool under controlled conditions for one to four hours.

Of the many product applications of which the present invention may be used, that of lighting fixtures may best illustrate the polycarbonate solid surface product and its unique appearance. Generally solid surface is one-half inch in thickness and it is the thickness, as well as the composition that makes these products opaque.

The present invention can be lit from behind with effective light transmission that creates unusual lighting. This feature alone opens up market possibilities in lighting, signage, displays, dance floors and other commercial applications. In addition, because of the translucent properties of the present invention, the present invention is particularly well-suited for use as a countertop material that can be custom colored by the installer on the reverse side to match any desired color. The color coating transmits through the material, which allows the material to be used as a standard solid surface material without any limitation as to color.

Table 2. provides possible variation ingredients and amounts of the present invention. These are variations from the embodiment as identified by the ingredients as provided in Table 1. Table 2. provides ranges of amounts appropriate for the present invention, and also provides alternative ingredients which may be used.

TABLE 2

| Item # | Ingredient | Percent by Weight | Alternative Ingredients |
|---|---|---|---|
| 1. | Polyester Resin solution, 40% monomer | 40–60.0% | |
| 2. | BPO LV40 (catalyst) | 00–0.20% | |
| 3. | MEKP-9 (catalyst) | 00–01.5% | Cumene Percadox Liladox |
| 4. | BYK 555 | 00–00.5% | |
| 5. | BYK 990 | 00–00.1% | |
| 6. | Skylight pigment | 00–01.0% | Alternative Pigments Reactive Dyes Polyester Dyes |
| 7. | Aerosil 200 | 00–01.0% | |
| 8. | ATH, OC 1000 | 00–30.0% | Any ATH particle size in the 15–25 micron range |
| 9. | Fine clear particulate | 00–56.0% | |
| 10. | Polycarbonate, flat ground flakes | 05–25.0% | |

As shown in Table 2., alternative pigments, reactive dyes or polyester dyes may be substituted for skylight pigment. (Item 6.). The distinction between pigments and dyes is that pigments are inherently opaque while dyes tend to be translucent. Pigment color and concentration may vary almost infinitely depending upon the desired appearance of the final product. The concentration of the pigment affects the product in that (all other things being equal), the greater the concentration of the pigment added, the more opaque the casting becomes, which destroys the translucency of the product.

Alternatively, a completely pigment-less casting may be used. More specifically, a product has been produced where no pigment is incorporated into the matrix. This product is then translucent and useful as a lighting lens which gives the effect of broken light as though it were coming through a frosted pane of glass. The color,: or lack of color, is reliant on the matrix cast color and the polycarbonate translucency.

As shown in Table 2., alternative trade name products available from various suppliers may be used for Item 8. These products would work just as well as Alcoa's ATH OC 1000. The important factor with respect to Item 8. is the particle site of the ATH. ATH particle sizes in the 15–25 micron range are preferable. This size range is preferable as ATH particles in this size range are visually less conspicuous when incorporated into a final product of the present invention. Further, ATH particles in this size range produce a viscosity that aids filler suspension of the present invention.

Further, suitable polycarbonate varies by composition. The embodiment as identified in Table 1. uses Lexan, which is a trade name for a product available from GE, for polycarbonate in its pure form. However, impact modified forms are also suitable for the present invention. Both particle size and flatness are important criteria for the present invention. That is, polycarbonate manufacturers oftentimes incorporate various additives into the pure polycarbonate to give the material increased impact strength. These may be, phthlates or rubber compounds. The present invention has been developed around a particle that is approximately ¼ to ½ inch in length and width and approximately 1/32 to 1/16 inches thick. Experimentation using particles of other sizes and configurations proved that the thicker the particle the less ability the particle has to absorb the free monomer in the polyester solution. Poorly saturated polycarbonate particles do not bind well in the matrix, and poorly bound particles have a tendency to "pop" out or dislodge from the sheet when the sheet is being sanded or cut.

Alternatively, particles that are too thin, that is less than 1/32 inch thick, tend to absorb too much monomer and become opaque white in color, losing their translucency and optical properties.

Each of the items of the present invention are related in that variations in one inevitably results in variations in the other items. For example, increasing the monomer content of the polyester resin solution (Item 1.) results in a less viscous polyester resin solution. A less viscous polyester resin solution allows for the addition of a greater amount of polycarbonate (Item 10.), ATH (Item 8.), fine clear particulate (Item 9.) or aerosil (Item 7.) or any combination of these in the present invention. This type of more highly filled system would, in turn, require additional amounts of BYK 990 (Item 5.) and pigment (Item 6.). Conversely, a higher viscosity polyester solution would allow less filler than the amount used in the embodiment as shown in Table 1. As is clear from the foregoing, many variations can be created, with each variation effecting the final color and appearance of the product.

What is claimed is:

1. A composition, comprising:
   a monomer polyester resin solution;
   an air-releasing agent;
   a wetting agent;
   a colorant;
   a thixing agent;
   an alumina trihydrate particle;
   a clear polyester particulate; and
   a polycarbonate flake.

2. The composition as claimed in claim 1 wherein said polyester resin solution comprises 40% monomer.

3. The composition as claimed in claim 2 wherein said polyester resin solution is isophthalic polyester resin solution and orthophthalic polyester resin solution.

4. The composition as claimed in claim 1 comprising from 00–00.5 weight percent of said air releasing agent.

5. The composition as claimed in claim 4 wherein said air releasing agent is a combination of polymers, polysiloxanes and aromatic hydrocarbons.

6. The composition as claimed in claim 1 comprising from 00–0.1% of said thixing agent.

7. The composition as claimed in claim 6 wherein said wetting agent is a combination of polymers, polysiloxanes and aromatic hydrocarbons.

8. The composition as claimed in claim 1 comprising from 00–01.0 weight percent of said colorant.

9. The composition as claimed in claim 8 where in said colorant is a pigment, a reactive dye, or a polyester dye.

10. The composition as claimed in claim 1 comprising from 00–01.0 weight percent of said thixing agent.

11. The composition as claimed in claim 10 wherein said thixing agent is fumed silica.

12. The composition as claimed in claim 1 wherein said alumina trihydrate particle is in the 15–25 micron size range.

13. The composition as claimed in claim 12 comprising from 00–30.0 weight percent of said alumina trihydrate.

14. The composition as claimed in claim 1 comprising from 00–56.0 weight percent of a fine clear particulate.

15. The composition as claimed in claim 1 wherein said polycarbonate flake is approximately ¼ to ½ inch in length and width and approximately 1/32 to 1/16 inches thick.

16. The composition as claimed in claim 15 comprising from 05–25.0 weight percent of said polycarbonate.

17. A polycarbonate composition for use in producing solid surface products, comprising:

from 40–60 weight percent of a monomer polyester resin solution;

from 00–00.5 weight percent of an air releasing agent;

from 00–00.1 weight percent of a wetting agent;

from 00–01.0 weight percent of a colorant;

from 00–01.0 weight percent of a thixing agent;

from 00–30.0 weight percent of an alumina trihydrate particle;

from 00–56.0 weight percent of a clear particulate; and from 05–25.0 weight percent of a polycarbonate flake.

18. The polycarbonate composition as claimed in claim 17 wherein said monomer polyester resin solution comprises 40% monomer.

19. The polycarbonate composition as claimed in claim 18 wherein said monomer polyester resin solution is isophthalic polyester resin solution and orthophthalic polyester resin solution.

20. The polycarbonate composition as claimed in claim 17 wherein said air releasing agent is a combination of polymers, polysiloxanes and aromatic hydrocarbons.

21. The polycarbonate composition as claimed in claim 17 wherein said wetting agent is a combination of polymers, polysiloxanes and aromatic hydrocarbons.

22. The polycarbonate composition as claimed in claim 17 where in said colorant is a pigment, a reactive dye, or a polyester dye.

23. The polycarbonate composition as claimed in claim 17 wherein said thixing agent is fumed silica.

24. The composition as claimed in claim 17 wherein said alumina trihydrate particle is in the 15–25 micron size range.

25. The composition as claimed in claim 17 wherein said polycarbonate flake is approximately ¼ to ½ inch in length and width and approximately 1/32 to 1/16 inches thick.

* * * * *

UNITED STATES PATENT AND TRADEMARK OFFICE
CERTIFICATE OF CORRECTION

PATENT NO. : 6,696,509 B2
DATED : February 24, 2004
INVENTOR(S) : Risley

It is certified that error appears in the above-identified patent and that said Letters Patent is hereby corrected as shown below:

Column 1,
Line 51, delete the comma, first occurrence.

Column 2,
Line 25, delete the comma, first occurrence.

Column 4,
Line 2, delete "Corp" and insert therefore -- Corp. --.
Line 45, delete the comma, first occurrence.

Column 5,
Line 63, delete the colon, first occurrence.

Column 7,
Line 2, delete "00-0.1%" and insert therefore -- 00-00.1% --.
Line 8, delete "where in" and insert therefore -- wherein --.

Column 8,
Line 22, delete "where in" and insert therefore -- wherein --.

Signed and Sealed this

Twenty-seventh Day of July, 2004

JON W. DUDAS
*Acting Director of the United States Patent and Trademark Office*